US012045566B2

(12) United States Patent
Edwards et al.

(10) Patent No.: US 12,045,566 B2
(45) Date of Patent: Jul. 23, 2024

(54) COMBINING MULTIPLE MESSAGES FROM A MESSAGE QUEUE IN ORDER TO PROCESS FOR EMOJI RESPONSES

(71) Applicant: Capital One Services, LLC, McLean, VA (US)

(72) Inventors: Joshua Edwards, Philadelphia, PA (US); Eric Loucks, Tysons, VA (US); Kevin Osborn, Newton Highlands, MA (US); George Bergeron, Falls Church, VA (US); Kyle Johnson, Arlington, VA (US); Brian Lee, South Riding, VA (US)

(73) Assignee: Capital One Services, LLC, McLean, VA (US)

( * ) Notice: Subject to any disclaimer, the term of this patent is extended or adjusted under 35 U.S.C. 154(b) by 144 days.

(21) Appl. No.: 17/141,846

(22) Filed: Jan. 5, 2021

(65) Prior Publication Data
US 2022/0215169 A1 Jul. 7, 2022

(51) Int. Cl.
*G06F 40/274* (2020.01)
*G06F 40/279* (2020.01)
*G06N 20/00* (2019.01)
*H04L 51/02* (2022.01)

(52) U.S. Cl.
CPC .......... *G06F 40/274* (2020.01); *G06F 40/279* (2020.01); *G06N 20/00* (2019.01); *H04L 51/02* (2013.01)

(58) Field of Classification Search
CPC ...... G06F 40/30; G06F 40/274; G06F 40/279; G06N 20/00; H04L 51/02
See application file for complete search history.

(56) References Cited

U.S. PATENT DOCUMENTS

| 6,381,241 | B1 * | 4/2002 | Ghirnikar | ............... H04L 51/58 |
| | | | | 455/466 |
| 7,184,167 | B1 * | 2/2007 | Ito | ........................ G06F 3/1251 |
| | | | | 358/1.18 |
| 10,318,109 | B2 | 6/2019 | Desjardins | |
| | | (Continued) | | |

FOREIGN PATENT DOCUMENTS

KR     20110026218     *  3/2011   ............... G06F 8/00

*Primary Examiner* — Daniel C Washburn
*Assistant Examiner* — Paul J. Mueller
(74) *Attorney, Agent, or Firm* — Sterne, Kessler, Goldstein & Fox P.L.L.C.

(57) ABSTRACT

Disclosed herein are system, method, and computer program product embodiments for providing an untrained machine learning model with a combined message and an appropriate emoji reaction icon. An embodiment operates by receiving a first and second user message. The first and second user comprises a first and second user text or a first and second user-inserted emoji reaction icon, respectively. The first or second user text is associated with a first or second system-specified emoji reaction icon, respectively. Thereafter, the first user message is determined to be associated with the second user message, the combined message is created based on the first and second messages, and the appropriate emoji reaction is identified as associated with the combined message. The combined message and associated appropriate emoji reaction icon are then sent to an untrained machine learning model configured to for training.

20 Claims, 8 Drawing Sheets

(56) References Cited

U.S. PATENT DOCUMENTS

| | | | |
|---|---|---|---|
| 11,563,708 B1* | 1/2023 | Devaraj | H04L 51/216 |
| 2006/0106609 A1* | 5/2006 | Saito | G10L 13/00 |
| | | | 704/260 |
| 2007/0186172 A1* | 8/2007 | Sego | H04L 12/1831 |
| | | | 709/204 |
| 2011/0046960 A1* | 2/2011 | Spier | H04L 65/1063 |
| | | | 704/270 |
| 2017/0052946 A1* | 2/2017 | Gu | G06F 40/274 |
| 2017/0185581 A1 | 6/2017 | Boja et al. | |
| 2017/0308290 A1 | 10/2017 | Patel | |
| 2017/0344224 A1 | 11/2017 | Kay et al. | |
| 2020/0252365 A1* | 8/2020 | Peltier | H04W 4/12 |
| 2021/0216723 A1* | 7/2021 | Zhang | G06K 9/6268 |
| 2022/0070630 A1* | 3/2022 | Rubin | H04L 51/234 |

* cited by examiner

COMBINING MULTIPLE MESSAGES FROM A MESSAGE QUEUE IN ORDER TO PROCESS FOR EMOJI RESPONSES

BACKGROUND

Many applications permit users to provide messages in real-time. In response, the application provides one or more emoji reaction icons indicating a user sentiment (e.g., happy, sad, or excited) towards the message. For example, the message may be "Good morning, John," and the emoji reaction icon may be a particular emoji (e.g., a happy face, a sad face, or a sun). In many circumstances, users may submit multiple messages to form a complete thought. For example, a user may incorrectly enter a word or phrase in the first message and subsequently provide the correct word or phrase in the second message. These messages may be associated with different emoji reaction icons. In turn, the emoji reaction for the complete thought may be different from one or both of the emoji reaction icons associated with the individual messages. Accordingly, irrespective of whether the messages are to be combined or not, applications are unable to accurately determine the appropriate emoji reaction icons for the intended user messages without sufficient training

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
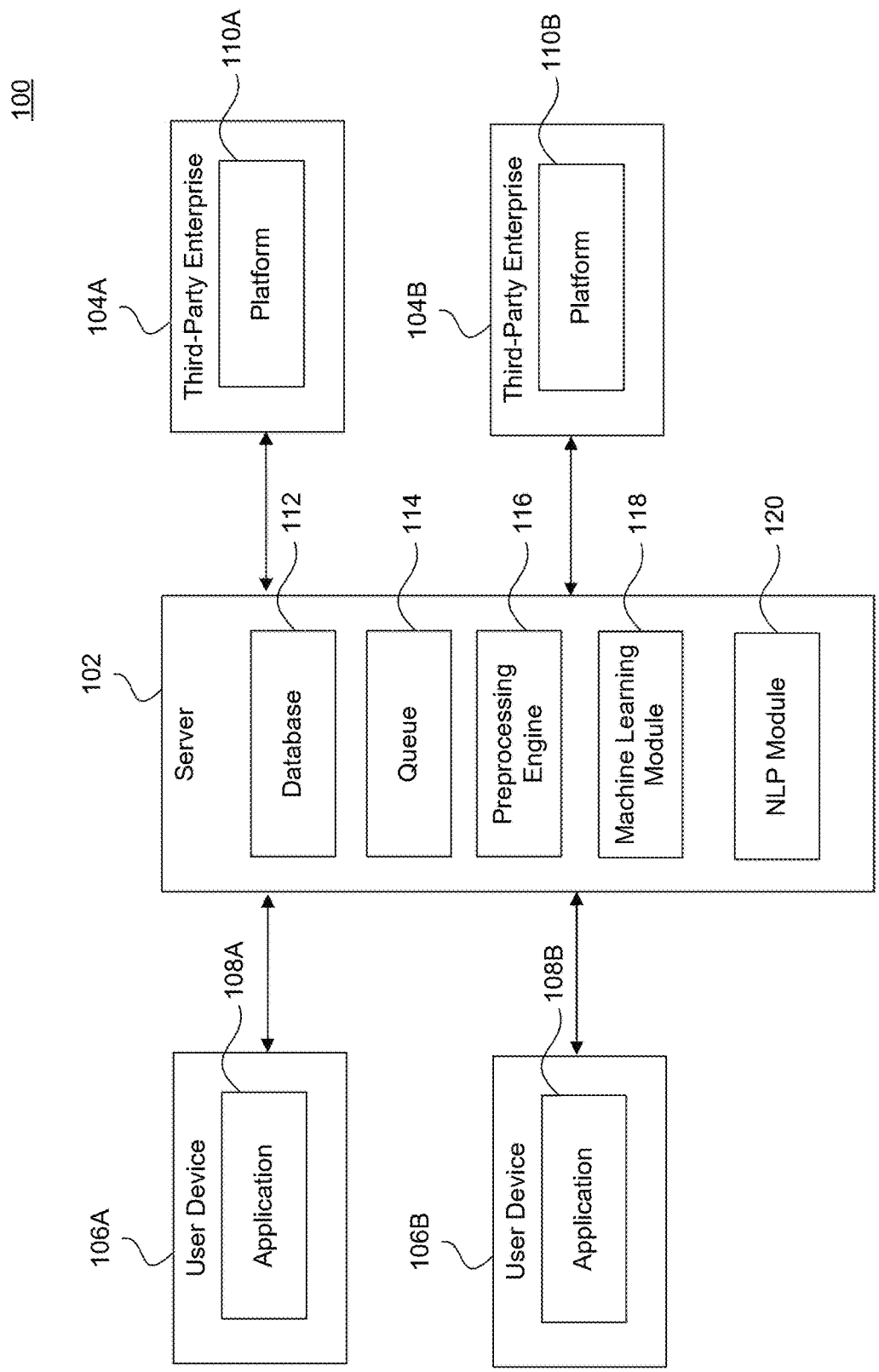
FIG. 1 is a block diagram of a system for training a machine learning module to determine an appropriate emoji reaction icon associated with one or more user message, according to some embodiments.

Provided herein are system, apparatus, device, method and/or computer program product embodiments, and/or combinations and sub-combinations thereof, for training a machine learning model to determine an expected emoji reaction icon associated with one or more user messages. The present disclosure relates to a server training a machine learning model to determine one or more expected emoji reaction icons associated with a user message. The user message can be in the form of text (e.g., words or phrases) or emoji reaction icons. For example, in some embodiments, the user message may be the phrase "Good morning, Joshua," and the associated emoji reaction can be a sun, a happy face, and/or a person stretching their arms. Similarly, in some embodiments, the user message may be the phrase "Where are you, Joshua," and the associated emoji reaction may be a confused face, a mad face, and/or an exclamation mark.

Accordingly, in many circumstances, individual user messages provided to the machine learning model are grammatically incomplete. For example, the user message may be grammatically wrong—e.g., "Hi Johsua" instead of "Hi Joshua." The user messages provided to the machine learning model may also be grammatically incomplete—e.g., "Hi Joshua, How" instead of "Hi Joshua, How are you?" The user messages may also be a single word—e.g., "Joshua"—or only one or more emoji reaction icons. As a result, the machine learning model may not be sufficiently trained to determine the appropriate emoji reaction icons associated with the intended user message. This may be problematic when the emoji reaction icon of the incorrect/incomplete user input is different from or not inclusive of the appropriate emoji reaction icon of the intended user input. For example, the emoji reaction icon for the incomplete user input of "Hi Joshua, Good" may be a hand wave and/or a thumbs up. In contrast, the appropriate emoji reaction icon for the complete user input of "Hi Joshua, Good Morning" may be a hand wave and/or sunshine.

Thus, to train a machine learning module that determines the appropriate emoji reaction icon upon receipt of future user messages, the server preprocesses the user messages to determine if they are grammatically incomplete utilizing one or more triggering conditions, as will be discussed in more detail below. Thus, after a user message provokes a triggering condition, the server may combine a user message with another subsequent (or previous) user message and provide the combined user message to the machine learning model for training. This training allows the machine learning module to determine one or more appropriate emoji reaction icons for future user messages.

In some embodiments, after training the machine learning model to determine the appropriate emoji reaction icon associated with user messages, the server preprocesses user messages of user devices for third-party enterprises providing applications to the user devices. The user devices may download or host third-party enterprise applications, which, in turn, may receive user messages. Upon receiving the user message, the third-party enterprise applications may send the user messages to the server for preprocessing. In doing so, the server may determine whether to combine the user messages so that the machine learning model is provided with the intended user message. The server may then send the user message to the machine learning model to determine the appropriate emoji reaction icon associated with the user message and provide the appropriate emoji reaction icons and/or the user message to the third-party enterprise.

FIG. 1 illustrates system 100 for training a machine learning module to determine an expected emoji reaction icon associated with one or more user messages, according to some embodiments. System 100 includes server 102, third-party enterprises 104A-B, and/or user devices 106A-B. Third-party enterprises 104A-B provides a platform or application for receiving user messages from user devices 106A-B. Example third-party enterprises 104A-B may include Slack developed by Slack Technologies, Inc. of San Francisco, CA, Facebook developed by Facebook, Inc. of Menlo Park, CA, and iMessage developed by Apple Inc. of Cupertino, CA, to provide a few examples. Accordingly, user devices 106A-B may be any type of computing device, such as a mobile device, a personal computer (desktop or laptop), a consumer device (e.g., a personal digital assistant (PDA), a smartphone desktop, capable of providing user input.

In some embodiments, server 102 may process user messages provided on an application 108A-B of user device 106A-B. In some embodiments, application 108A-B may belong to user devices 106A-B and thus be a first-party application (e.g., a text messaging application). Application 108 may also belong to third-party enterprise 104A-B and thus be a third-party application that is, for example, downloaded by users of user devices 106A-B. Notwithstanding whether application 108A-B belongs to user devices 106A-B or third-party enterprises 104A-B, application 108A-B sends the user messages to server 102 to determine an expected emoji reaction icon associated with the user messages. In some embodiments, application 108A-B may send the user messages to server 102 without sending them to third-party enterprises 104A-B.

Along these lines, in some embodiments, server 102 may processes user messages provided on a platform 110 (e.g., a website) of third-party enterprises 104A-B by users of user devices 106A-B. As described above, third-party enterprise 104A may be Facebook developed by Facebook, Inc. of Menlo Park, CA Accordingly, users of user devices 106A-B may provide user messages on platform 110 of third-party enterprise 104A-B. In response, third-party enterprise 104A-B may provide the user messages to server 102 to determine an expected emoji reaction icon associated with user messages.

Server 102 includes database 112, queue 114, preprocessing engine 116, machine learning module 118, and natural language processing (NLP) module 120. Database 112 includes user text and associated emoji reaction icons, as will be described in more detail below. In some embodiments, an authorized user (e.g., administrator) may provide the server 102 with the user text and associated emoji reaction icons. Database 112 may also receive the user text and associated emoji reaction icons from third-party enterprises 104A-B.

FIGS. 2-5 illustrates emoji reaction icons 202, 302A-C, 402A-B, and 502A-G, according to some embodiments. In some embodiments, emoji reaction icons 202, 302A-C, 402A-B, and 502A-G may be part of any known International Organization for Standardization (ISO) standard, as would be known by a person of ordinary skill in the art. Emoji reaction icons 202, 302A-C, 402A-B, and 502A-G may also be custom to the third-party enterprises 104A-B (of FIG. 1).

Figure 2:
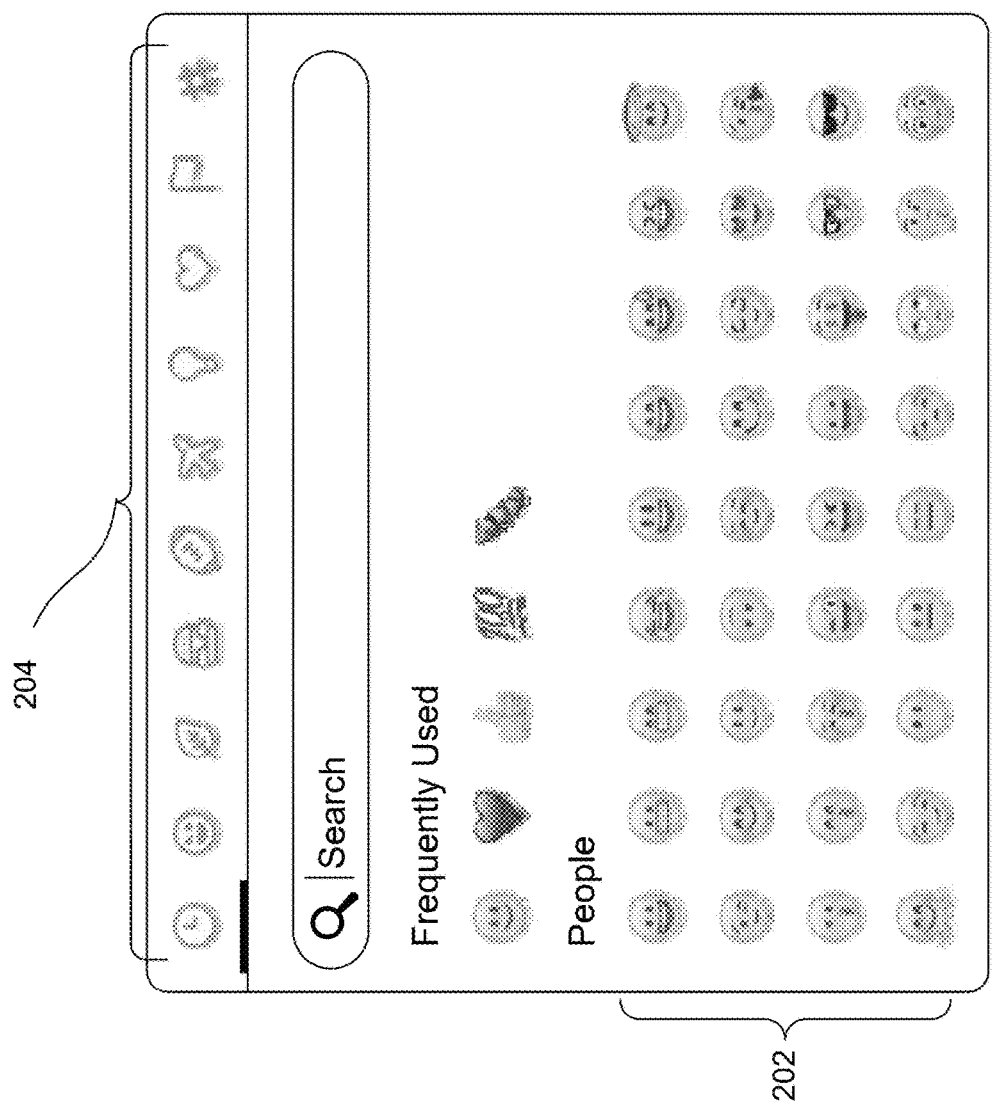
FIG. 2 illustrates example emoji reaction icons, according to some embodiments.
Figure 3:
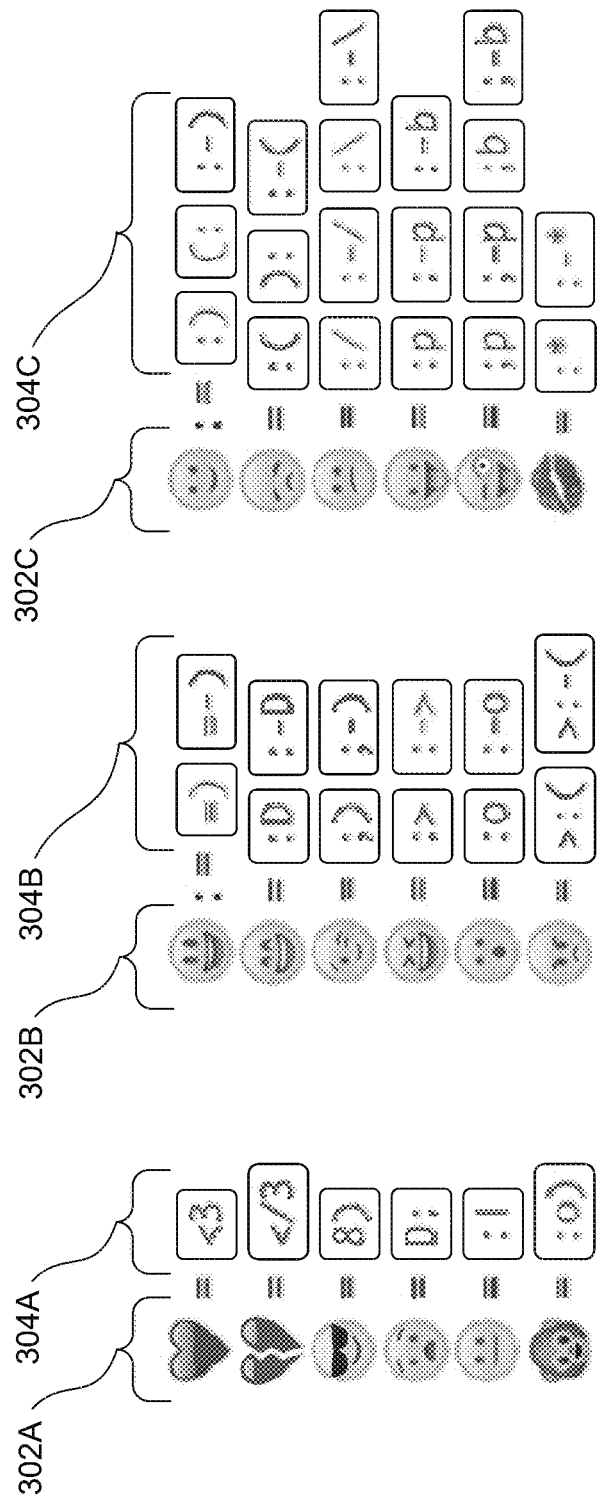
FIGS. 3-5 illustrate user text corresponding to emoji reaction icons, according to some embodiments.
Figure 4:
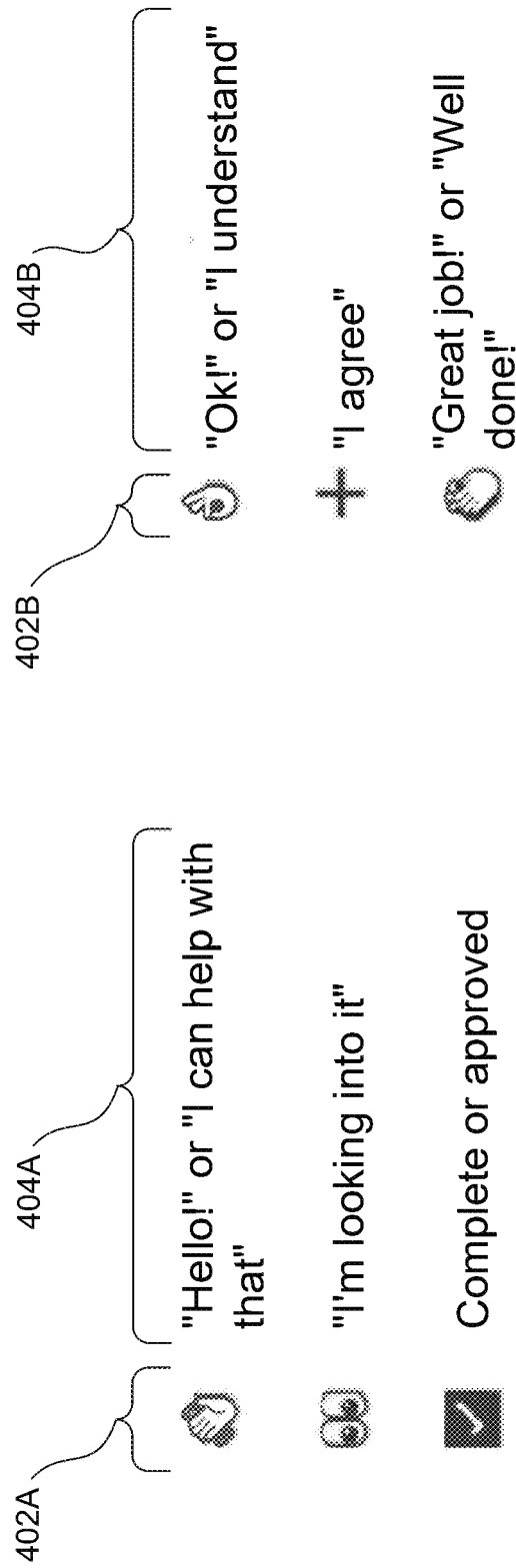

Referring to FIG. 2, emoji reaction icons 202 may be of different types 204. For example, as illustrated, emoji reaction icons 202 may be a facial expression representing a mood (e.g., happy, sad, excited, crying, etc.). Other types 204 of emoji reaction icons may pertain to ideograms relating to the same or different genres, such as common objects, places, types of weather, sports, and animals, to name some examples. For example, as illustrated in FIG. 3, emoji reaction icons 302A-C may include a heart, a broken heart, a monkey face, and lips. As shown in FIG. 4, emoji reaction icons 402A-B may include a waving hand, rolling eyes, a check marked box, a plus sign, and clapping hands. As provided in FIG. 5, emoji reaction icons 502A-G may include a ping pong racket and ball, a tangerine, a Taurus sign, a taco, and a taxi.

Figure 5:
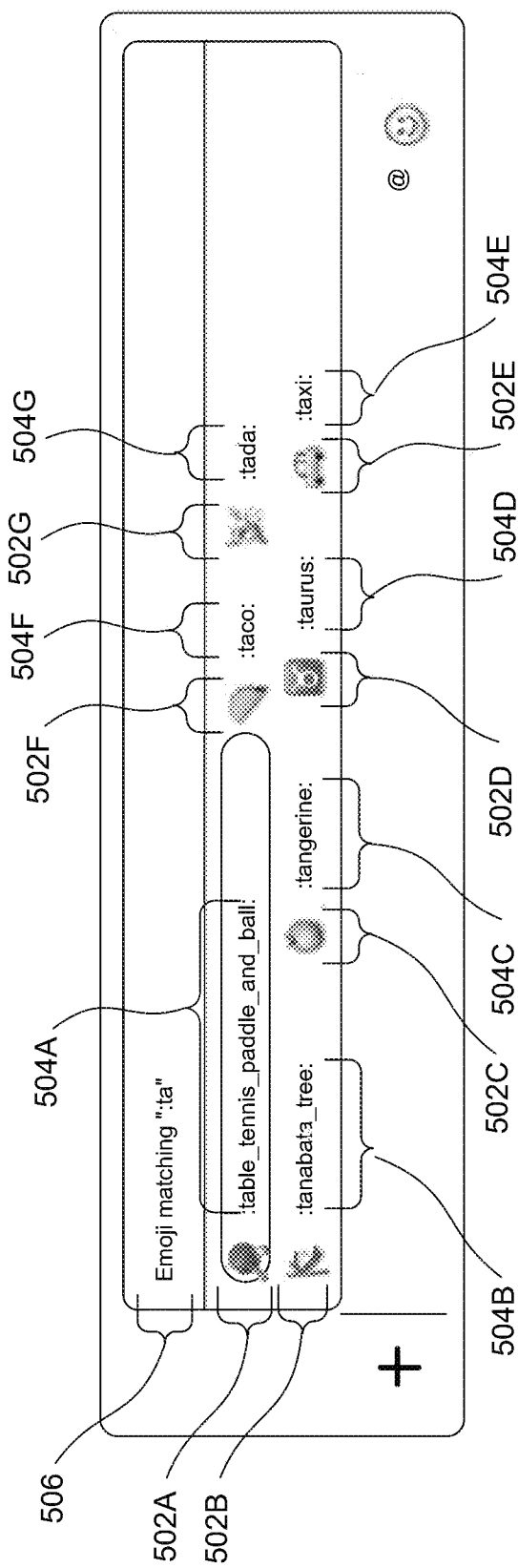

Referring to FIGS. 3-5, emoji reaction icons 302A-C, 402A-B, and 502A-G corresponding to user text 304A-C, 404A-B, and 504A-G, according to some embodiments. User text 304A-C, 404A-B, and 504A-G may be words (e.g., "Hi," "Sunshine," "Taco," "Vehicle," "Celebrate"), phrases (e.g., "Good morning" and "Goodbye"), characters (":)", ":(" and "¯\_(ツ)_/¯"), or any combination thereof. User text 304A-C, 404A-B, and 504A-G may correspond to one or more emoji reaction icons 302A-C, 402A-B, and 502A-G. Along these lines, different user text 304A-C, 404A-B, and 504A-G may correspond to one or more emoji reaction icons 302A-C, 402A-B, and 502A-G. For example, a particular user text 304A-C, 404A-B, and 504A-G (e.g., "Vehicle") may correspond to multiple different emoji reaction icons 302A-C, 402A-B, and 502A-G (e.g., a car, a truck, and a sports utility vehicle). Further, as illustrated in FIG. 3, different user text 304C (e.g., ":)", ":(", and "💻") may correspond to a single emoji reaction icon 302C (e.g., "💻").

Accordingly, referring to FIG. 5, when a user enters all or a portion of the user text 504A-G corresponding to the emoji reaction icons 502A-G, server 102 (of FIG. 1) may determine the emoji reaction icons 502A-G corresponding to the user text. For example, as illustrated, the user may enter user text "tangerine," and server 102 may determine that the emoji reaction icon 502C (i.e., a tangerine) corresponds to the message. Server 102 may provide the emoji reaction icon 502C, alone or along with any other user text provided in the user message (e.g., "Do you like"), to preprocessing engine 116. Accordingly, as will be described in more detail below, preprocessing engine 116 may determine whether to combine the user message with another user message before sending the user message and any associated emoji reaction icons to machine learning module 118 for training.

Referring to FIG. 1, server 102 receives user messages from user devices 106A-B and places the messages in queue 114. Queue 114 stores the user messages until preprocessing engine 116 analyzes the user messages. Thus, queue 114 may contain any number of user messages (e.g., 10, 50, or 100 messages) provided by user devices 106A-B.

As described above, queue 114's user messages may include user text and/or emoji reaction icons. For example, in some embodiments, a message may solely include the user text "Hi Thomas." As illustrated above, the user text "Hi Thomas" can correspond to one or more emoji reaction icons (e.g., a hand wave) stored in database 112. In some embodiments, a message may include user text and an emoji (e.g., the user text "Hi Thomas" with the emoji reaction icon of a smiley face). In some embodiments, a message may solely include emoji reaction icons (e.g., a smiley face, a celebration sign, and an exclamation point).

Upon receipt of the user message, server 102 may associate a timestamp and/or a user indication with the user message. The timestamp specifies a time of submission by a user. Similarly, the user indication specifies the user submitting the user message. Accordingly, user messages deemed to be associated with each other may be from the same user or different users. For example, a particular user may submit the user message "Hi Tomas," and another user may submit the user message "Thomas*" to correct the misspelling of the name "Thomas." Likewise, the same user may submit the consecutive user messages "Hi Tomas" and "Thomas*" to correct the misspelling of the name "Thomas" in the first message.

Preprocessing engine 116 determines whether to combine user messages in queue 114 before forwarding to machine learning module 118 for training based on the received user message and associated emoji reaction icons. In doing so, preprocessing engine 116 analyzes each user message in queue 114 sequentially and determines if the user message triggers one or more predetermined triggering conditions. As discussed above, the user message includes user input and/or emoji reaction icons. In turn, the predetermined triggering conditions depend on whether each user message contains user text, emoji reaction icons, or a combination of user text and emoji reaction icons.

For example, in some embodiments, if the user message contains user input (e.g., "Hi Joshua") alone or in combination with one or more emoji reaction icons (e.g., a smiley face and/or sunshine), preprocessing engine 116 may first determine if the user message triggers one or more predetermined trigger conditions relating to whether the user text of the user message is grammatically incomplete. Thus, the predetermined triggering conditions may relate to the user text of the user messages, irrespective of whether the user messages also include emoji reaction icons. Example triggering conditions relating to the user text being grammatically incomplete include a missing comma in the middle of a phrase (e.g., the phrase "how are you Joshua" should read "how are you, Joshua"), a missing capital letter designating a proper noun a beginning of a sentence, and a missing period at the end of a sentence (e.g., "Josh is on"), to name a few examples. Accordingly, the preprocessing engine 116 may utilize NLP module 120 to determine if the user text of the user message is grammatically incomplete. The NLP module 120 may include the Natural Language Toolkit (NLTK), spaCy, and TextBlob, as would be understood by a person of ordinary skill in the art, to name a few examples.

Accordingly, upon the user message triggering one or more of the predetermined conditions relating to the user text being grammatically incomplete, preprocessing engine 116 analyzes the subsequent user message in queue 114 and determines whether the subsequent user message resolves the grammatical completeness of the previous user message. If so, preprocessing engine 116 combines both messages, determines one or more emoji reaction icons associated with the combined message, and sends the combined user message and the associated emoji reaction icons to the machine learning module 118. Otherwise, preprocessing engine 116 determines one or more one or more emoji reaction icons associated with the first message and sends the first user message and the associated emoji reactions to machine learning module 118. In doing so, preprocessing engine 116 maintains the subsequent user message in queue 114 to be analyzed next by preprocessing engine 116.

Along these lines, in some embodiments, preprocessing engine 116 may determine that the user text of the user message is grammatically complete. Preprocessing engine 116 may then determine if the user text includes a character indicating correction of one or more words or a phrase (e.g., "Joshua*" or "Anchorage, Alaska*"). If the user message includes the character, preprocessing engine 116 determines, using the NLP module 120, whether another user message in queue 114 has one or more words or phrases to be replaced with the analyzed message. Thus, the other message in queue 114 may include the words/phrases to be replaced as well as additional user text and/or emoji reaction icons. For example, the analyzed user message may be "I miss you*", and another user message in the queue 114 may be "I mss you. Hope all is well."

Accordingly, upon detection of a character indicating correction of words/phrases and another user message having the words/phrases to be replaced, preprocessing engine 116 combines the user messages by replacing the corrected words/phrase with the incorrect words/phrase and determines one or more emoji reaction icons associated with the combined message. Preprocessing engine 116 then sends the combined user message and associated emoji reaction icons to machine learning module 118. In doing so, the combined message may include the corrected words/phrases of the user message having a character indicating correction of words/phrases, as well as additional user text of the user message having the words/phrases being replaced. For example, as stated above, the analyzed user message may be "I miss you*", and another user message in the queue 114 may be "I mss you. Hope all is well." Accordingly, preprocessing engine 116 may determine that the combined message sent "I miss you. Hope all is well." and send this combined message and associated emoji reaction icons to machine learning module 118. However, if preprocessing engine 116 detects a character indicating correction of words/phrases but does not identify another user message having the words/phrases to be replaced, preprocessing engine 116 determines one or more associate emoji reaction icons and sends the user message and the associated emoji reaction icons to machine learning module 118.

In some embodiments, preprocessing engine 116 may determine that the user text of the user message is grammatically complete but does not include a character indicating the correction of one or more words or a phrase. Preprocessing engine 116 then determines whether the user message's user input is a single word or phrase. Accordingly, when preprocessing engine 116 determines that the user message's user input is more than a single word or phrase, preprocessing engine 116 determines one or more emoji reaction icons that are associated with the user message. Preprocessing engine 116 then sends the user message and associated emoji reaction icons to machine learning module 118.

However, when preprocessing engine 116 determines that the user input is a single word or phrase, preprocessing engine 116 may confirm that the single word/phrase does not correspond to predetermined answers of predetermined questions provided to a user. For example, when third-party enterprises 104A-B communicate with users of user devices 106A-B, third-party enterprises 104A-B may send a message seeking a response from a predetermined set of answers (e.g., "yes" or "no"). Thus, predetermined questions and/or predetermined answers can be provided by an authorized user of server 102 and/or third-party enterprises 110A-B. In some embodiments, even if the preprocessing engine 116 is unaware if the message is in response to a predetermined question, preprocessing engine 116 can determine that the message includes predetermined answers (e.g., yes, no, or maybe, I don't know.)

Accordingly, if the single word/phrase corresponds to the predetermined set of answers, preprocessing engine 116 appends the user message having the single word and phrase to the message (e.g., a message generated by third-party enterprise 104A-B) seeking the single word/phrase and determines one or more emoji reaction icons associated with the combined message. Preprocessing engine 116 then sends the combined message and associated emoji reaction icons to machine learning module 118. However, if the single word/phrase does not correspond to the predetermined set of answers, preprocessing engine 116 sends only the user message to the machine learning module 118. Moreover, preprocessing engine 116 may determine that although the single word/phrase does not correspond to the predetermined set of answer, the single word/phrase should be added to the predetermined set of answers. This can be done through machine learning module 118. In doing so, the next time the particular single word/phrase is provided in response to the predetermined question, preprocessing engine 118 will recognize the single word/phrase as one of the predetermined set of answers. Further, in some embodiments, preprocessing engine 116 may determine that the user message is grammatically incomplete based on the user message containing only one or more emoji reaction icons (e.g., a smiley face and/or sunshine). Thus, when preprocessing engine 116 determines that the user message containing only emoji reaction icons, preprocessing engine 116 assumes that the user message containing only emoji reaction icons was in response to a previous user message containing user text alone or together with emoji reaction icons. Thus, preprocessing engine 116 combines the user message containing only emoji reaction icons with the previous user message by appending the emoji reaction icons to the previous user message. For example, a first user message may be "Hi, how are you doing?," and the second user message may only be a smiley face. Accordingly, the preprocessing engine may deem that the second user message was in response to the first user message and combine the first and second user messages. In some embodiments, the user message containing user text alone or together with emoji reaction icons may immediately precede the user message containing only emoji reaction icons or may have been provided a number of user messages before the user message containing only emoji reaction icons. For example, a first and second user message may include user text and/or emoji reaction icons, and a third message may contain only emoji reaction icons. Therefore, upon combining the user message containing only emoji reaction icons was in response to the previous user message, preprocessing engine 116 may determine one or more emoji reaction icons associated with the combined user message. Preprocessing engine 116 may then send the combined user message and associate emoji reaction icons to machine learning module 118.

Further, when the preprocessing engine 116 detects the user message being grammatically incomplete based on the user message having one or more of the predetermined triggering conditions, preprocessing engine 116 may then determine whether a weighted score is associated with the user message. For example, when the user message contains only emoji reaction icons, preprocessing engine 116 may provide a weighted score (1.5 or 2.) to the emoji reaction icons of the user message. An authorized user of server 102 may specify the weighted score of the emoji reaction icon of a message containing only emoji reaction icons.

Also, as stated above, the user messages may be provided with time stamps. Accordingly, when the timestamp of the user message containing user text alone or together with emoji reaction icons is within a predetermined time of one or more other user messages, preprocessing engine 116 may provide a weighted score to the emoji reaction icons included in the user message or associated with words or phrases of the user message. Along these lines, each user message combined with another use message may be associated with a weighted score. An authorized user may specify the predetermined amount of time (e.g., 30 seconds, 1 minute, or 5 minutes). An authorized user of server 102 may specify the weighted score of the emoji reaction icon of a message containing emoji reaction icons and user text. The weighted score of an emoji reaction icon in a message containing user text and emoji reaction icons may be different than the weighted score of an emoji reaction icon of a message containing only emoji reaction icons.

In some embodiments, the weighted score of the emoji reaction icons included or associated with the user message can be based on who provided the message (e.g., the same or different user) or the time that the second message was provided after the first message. For example, one user message can include the user text "Hi everyone" and include or be associated with one hand wave emoji reaction. Another user message can include the user text "I hope you are all great day today!" and include or be associated with one hand-wave emoji reaction and one sunshine emoji reaction. Accordingly, if the same person provided both of these messages, the weighted score for the emoji reaction associated or included in both messages can be greater than the emoji reaction associated or included in a single user message. For example, the hand-wave emoji reaction and the sunshine emoji reaction can have a weighted score of 1.5 and 1.0, respectively. Further, if the second message was submitted within a predetermined amount of time of the first message (e.g., 30 seconds), the weighted score of the emoji reaction included or associated with the second message can be greater than that of a normal message (e.g., 1.5 or 2.0.)

Accordingly, machine learning module 118 receives a combined or single-user message and associated emoji reaction icons from preprocessing engine 116 for training. Thus, to perform the training, as would be known to a person of ordinary skill in the art, machine learning module 118 has one or more machine learning algorithms that build a mathematical model based on this sample data, also known as "training data"—i.e., the combined/single user messages and associated emoji reaction icons. After being trained for a period of time, machine learning model 118 can receive a user message and make a prediction of one or more associated emoji reaction icons without being explicitly programmed to do so.

In doing so, as would be understood by a person of ordinary skill, over time, machine learning module 118 can learn for themselves and more accurately provide emoji reaction icons associated with the combined/single user messages over time. Accordingly, machine learning module 118 is an application of artificial intelligence (AI) that provides server 102 the ability to automatically learn and improve from experience without being explicitly programmed.

Along these lines, after training the machine learning module 118, server 102 can provide user messages from queue 114 to machine learning module 118 to determine one or more associated emoji reaction icons. In doing so, server 102 can sequentially analyze user messages stored in queue 114 to determine whether to combine a user message with another user message using the same predetermined triggering conditions discussed above with respect to preprocessing engine 116. As stated above, the predetermined triggering conditions depend on whether each user message contains user text, emoji reaction icons, or a combination of user text and emoji reaction icons. Accordingly, as explained above, example triggering conditions can be that the user message's user text is grammatically incomplete (e.g., a missing comma in the middle of a phrase, a missing capital letter designating a proper noun a beginning of a sentence, and a missing period at the end of a sentence) and/or that the user message only contains one or more emoji reaction icons. Thus, after training the machine learning module 118, machine learning module 118 can also receive single/combined user message to determine one or more emoji reaction icons that appropriately correspond to the single/combined user message.

In some embodiments, after machine learning module 118 is trained and determines the emoji reaction icons associated with a single/combined user message, server 102 may send the user message and/or emoji reaction icons to third-party enterprises 104A-B or user devices 106A-B. As stated above, in some embodiments, user messages may be provided on application 108A-B of user devices 106A-B. Application 108A-B may belong to third-party enterprises 104A-B or user devices 106A-B. Thus, when application 108A-B belongs to third-party enterprises 104A-B, server 102 may send the emoji reaction icons and/or user message to third-party enterprises 104A-B. As explained above, server 102 may have received the user messages before third-party enterprises 104A-B. Accordingly, server 102 may send the user messages along with the reaction icons. However, when application 108A-B belongs to user devices 106A-B, server 102 may only send the emoji reaction icon back to user devices 106A-B.

Figure 6:
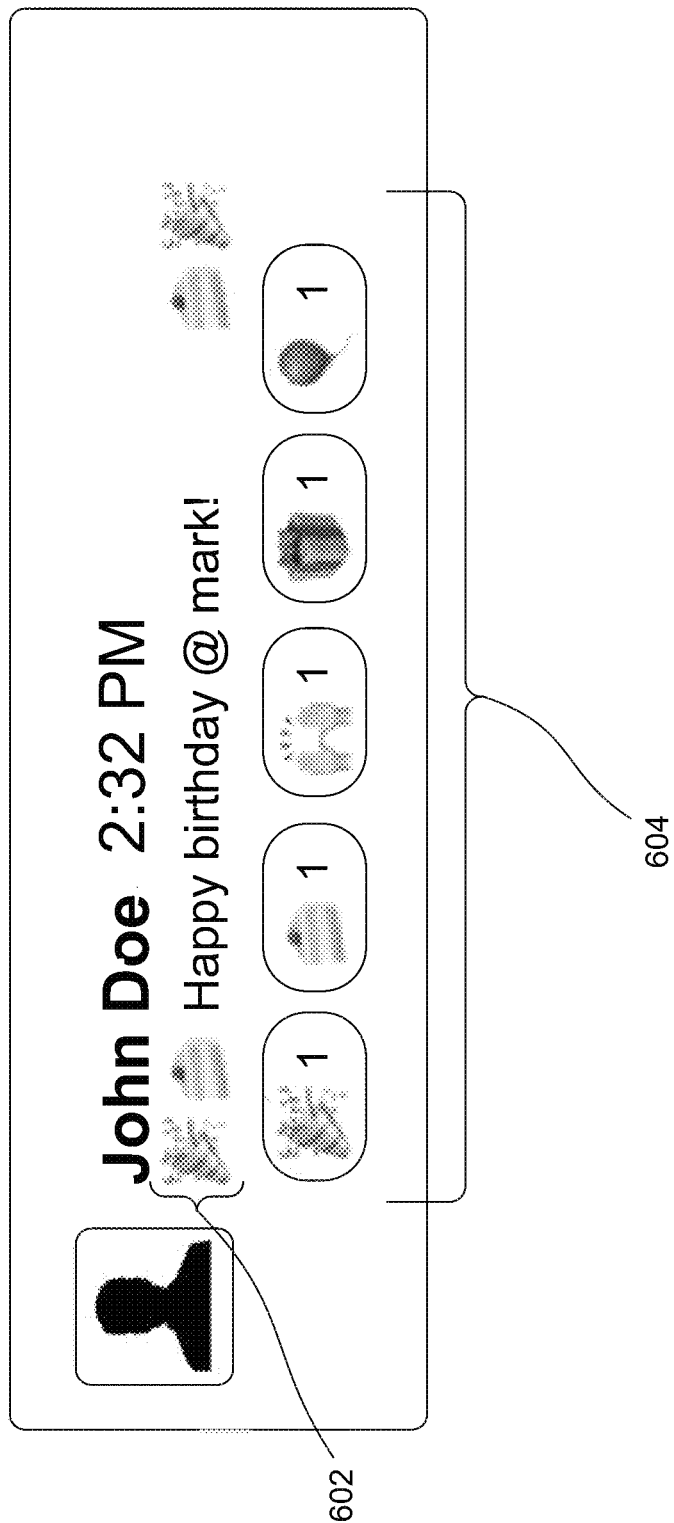
FIG. 6 illustrates an emoji reaction icon associated with a user message, according to some embodiments.

In some embodiments, as also noted above, third-party enterprises 104A-B may provide a platform 110 for receiving user messages from user devices 106A-B. Accordingly, server 102 may send the expected emoji reaction icons to the third-party enterprises 104A-B. Referring to FIG. 6, third-party enterprises 104A-B (of FIG. 1) may publish user message 602 along with expected emoji reaction icons 604. As described above, expected emoji reaction icons 604 indicate a user sentiment (e.g., happy, celebrate, sad, etc.) to the user message 602. Third-party enterprises 104A-B may permit users to select one or more expected emoji reaction icons 604 to indicate their sentiment towards user message 602.

Further, referring to FIG. 1, in some embodiments, third-party enterprises 104A-B may use expected emoji reaction icon(s) to determine an expected user response from messages provided by a customer representative or chatbot of the third-party representatives 104A-B.

Figure 7:
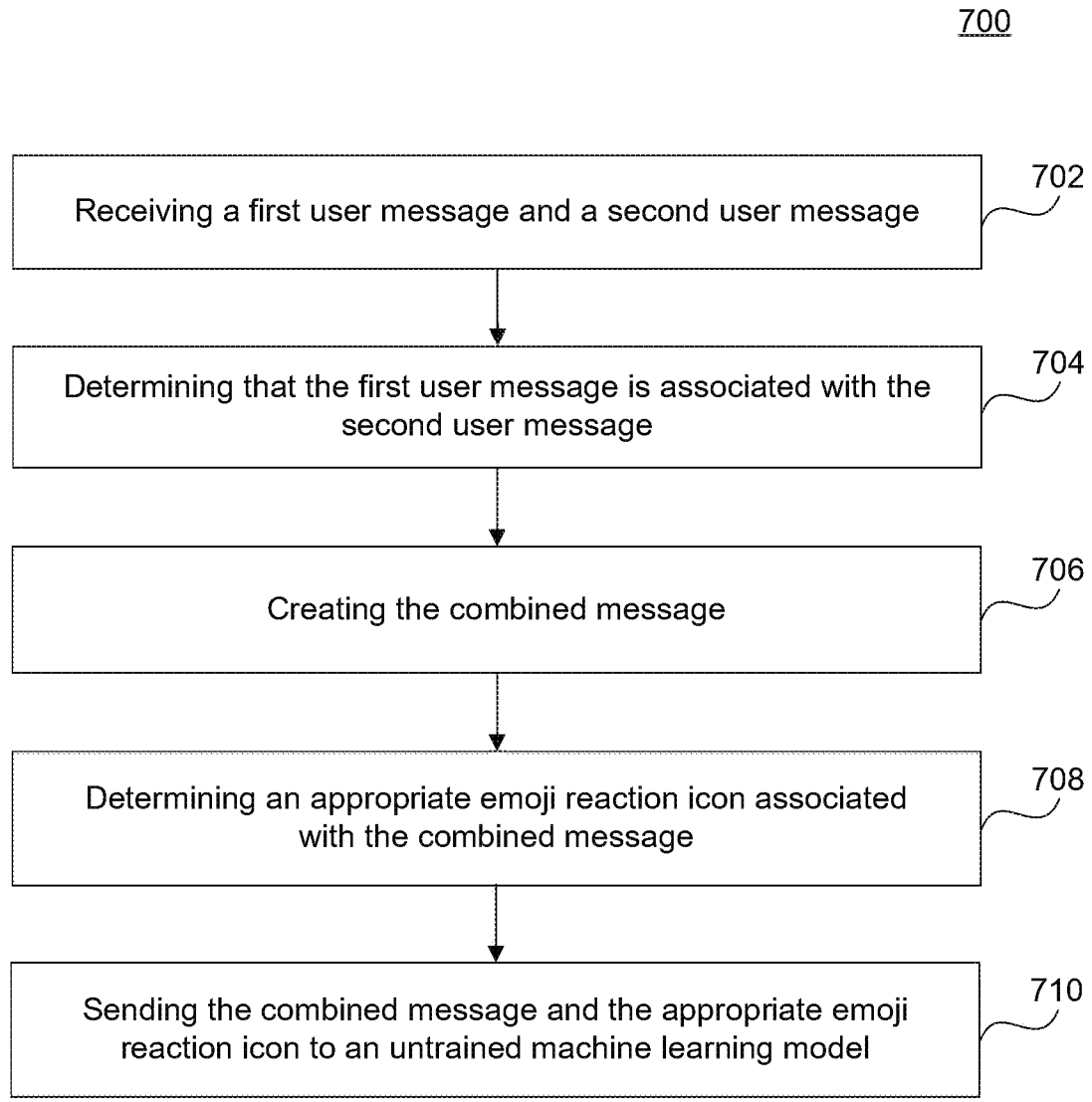
FIG. 7 is a flowchart illustrating a process for training a machine learning model to determine an appropriate emoji reaction icon associated with one or more user messages, according to some embodiments.

FIG. 7 is a flowchart for a method 700 for training an untrained machine learning model to determine an appropriate emoji icon associated with one or more user messages, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 7, as will be understood by a person of ordinary skill in the art.

Method 700 shall be described with reference to FIG. 1. However, method 700 is not limited to that example embodiment.

In 702, server 102 receives a first user message and a second user message, each including a user text and/or a user-inserted emoji reaction icon. The user text of the first and/or second user messages is associated with at least one system-specified emoji reaction icon.

In 704, server 102 determines that the first user message is associated with the second user message. For example, server 102 determines that the first and second user messages are associated based on one or more triggering conditions, which may be associated with the user text and/or emoji reaction icons of the first and/or second messages.

In 706, server 102 creates the combined message comprising the first user text, the first user-inserted emoji reaction icon, the second user text, or the second user-inserted emoji reaction icon.

In 708, server 102 identifies the appropriate emoji reaction icon associated with the combined message, for example, using database 112. As stated above, database 112 can store emoji reaction icons associated with user text and/or other emoji reaction icons.

In 710, server 102 sends the combined message and the appropriate emoji reaction icon to an untrained machine learning model. The untrained machine learning model then learns to predict a future emoji reaction icon upon receipt of a third user message based on the combined user message and appropriate emoji reaction icon.

Figure 8:
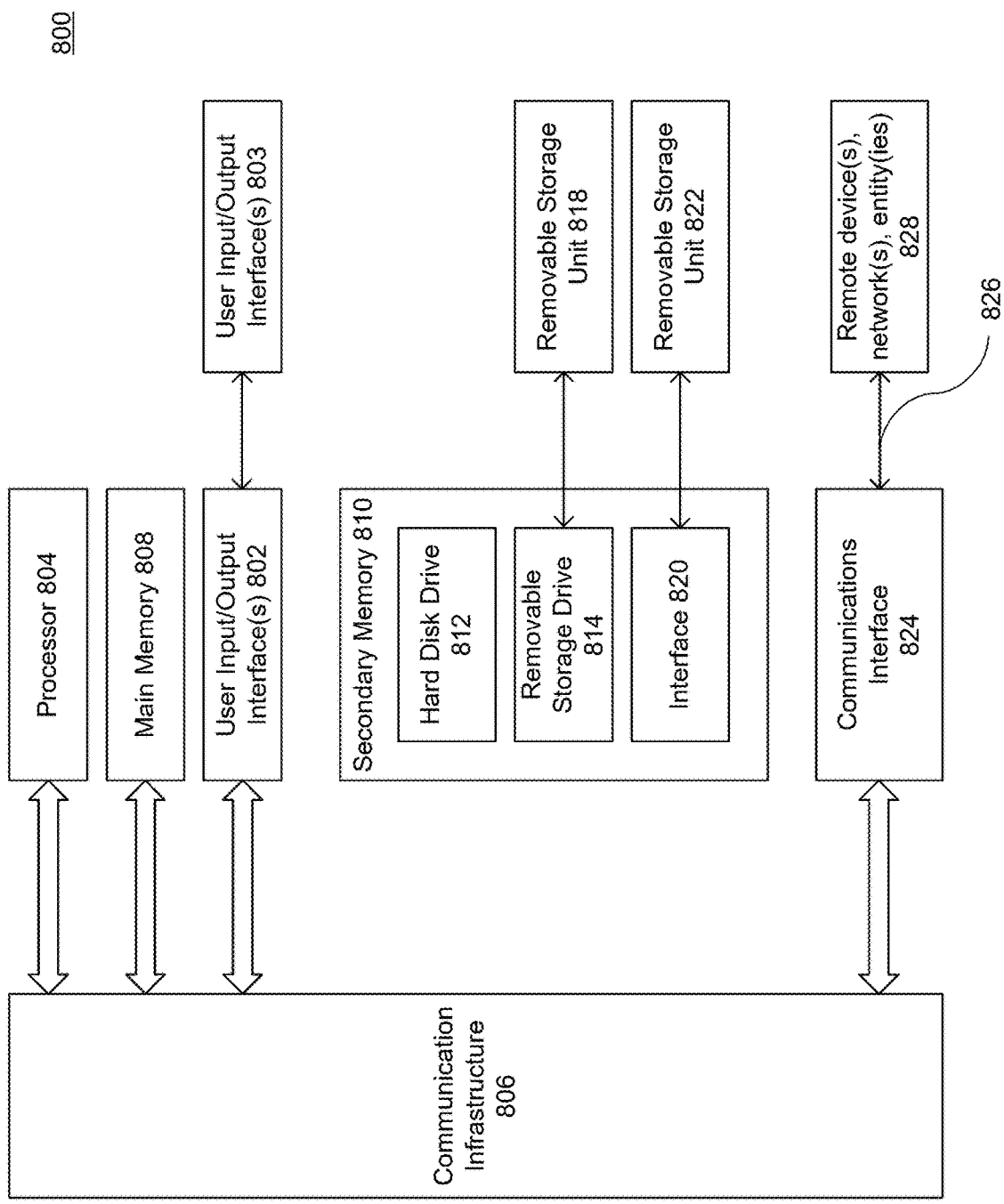
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818.

Removable storage unit 818 may include a computer-usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities, or other approaches for allowing computer programs and/or other instructions and/or data to be accessed by computer system 800. Such means, devices, components, instrumentalities, or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing an untrained machine learning model with a combined message and an appropriate emoji reaction icon associated with the combined message, comprising:

receiving a first user message and a second user message, wherein the first user message comprises at least one of a first user text or a first user-inserted emoji reaction icon, wherein the second user message comprises at least one of a second user text or a second user-inserted emoji reaction icon, and wherein at least one of the first user text or the second user text is associated with a first system-specified emoji reaction icon or a second system-specified emoji reaction icon, respectively;

determining that the first user message is associated with the second user message based on one or more triggering conditions that are used to determine whether to combine the first user message with the second user message, wherein the one or more triggering conditions depend on whether each of the first user message and the second user message comprises user text alone, one or more emoji reaction icons alone, or a combination of user text and one or more emoji reaction icons;

creating the combined message comprising at least one of at least a portion of the first user text or the first user-inserted emoji reaction icon and at least one of at least a portion of the second user text or the second user-inserted emoji reaction icon;

identifying the appropriate emoji reaction icon associated with the combined message; and sending the combined message and the appropriate emoji reaction icon to the untrained machine learning model, wherein:
the first user-inserted emoji reaction icon and the first system-specified emoji reaction icon express a user sentiment towards the first user text of the first user message, and the second user-inserted emoji reaction icon and the second system-specified emoji reaction icon express a user sentiment towards the second user text of the second user message, whereby the untrained machine learning model is configured to learn to predict a future emoji reaction icon upon receipt of a third user message based on the combined message and appropriate emoji reaction icon; and wherein the determining that the first user message is associated with the second user message comprises at least one of:
identifying a known character associated with a user message correction in the second user text of the second user message;

determining that the first user text of the first user message is grammatically complete when associated with the second user text of the second user message;

determining that the second user text of the second user message is a single word or a single phrase; or determining that the second user message comprises the second user-inserted emoji reaction icon and is an emoji only message.

2. The computer-implemented method of claim 1, wherein the second user message comprises the second user text such that the combined message comprises the second user text.

3. The computer-implemented method of claim 2, wherein the second user message further comprises the second user-inserted emoji reaction icon such that the combined message comprises the second user-inserted emoji reaction icon.

4. The computer-implemented method of claim 1, the determining that the first user message is associated with the second user message comprising at least one of:
the identifying the known character associated with the user message correction in the second user text of the second user message; or the determining that the second user text of the second user message is the single word or the single phrase.

5. The computer-implemented method of claim 4, the determining that the first user message is associated with the second user message further comprising:
determining that the first user text of the first user message is grammatically incomplete, the determined grammatical incompleteness of the first user text comprising at least one of a missing comma in the middle of a phrase, a missing capital letter designating a proper noun or a beginning of a sentence, or a missing period at the end of a sentence.

6. The computer-implemented method of claim 1, the determining that the first user text of the first user message is grammatically complete when associated with the second user text of the second user message comprising:
determining that the first user text of the first user message associated with the second user text of the second user message is more grammatically complete than the first user text of the first user message alone.

7. The computer-implemented method of claim 1, the determining that the first user message is associated with the second user message further comprising:
determining that the first user text of the first user message has a missing punctuation mark; and determining that the first user text of the first user message together with the second user text of the second user message form a complete sentence, wherein the combined message includes the first user text of the first user message and the second user text of the second user message.

8. The computer-implemented method of claim 1, the determining that the first user message is associated with the second user message further comprising:
determining that the single word or the single phrase of the second user message is different from a plurality of possible answers to a predefined question to be provided to a user upon receiving a predetermined user input.

9. The computer-implemented method of claim 1, the determining that the first user message is associated with the second user message further comprising:
determining that the second user-inserted emoji reaction icon of the second user message is a user reaction to the first user message.

10. The computer-implemented method of claim 9, the determining that the first user message is associated with the second user message further comprising:
determining that a first timestamp of the first user message is within a predetermined time from a second timestamp of the second user message.

11. The computer-implemented method of claim 10, the determining that the first user message is associated with the second user message further comprising:
providing an increased weighted score of the second user-inserted emoji reaction icon such that the increased weighted score of the second user-inserted emoji reaction icon is more than a weighted score of the second system-specified emoji reaction icon.

12. The computer-implemented method of claim 1, the creating of the combined message comprising at least one of:
replacing at least a portion of the first user message with at least a portion of the second user message; or appending at least a portion of the second user message to the first user message.

13. The computer-implemented method of claim 1, the creating of the combined message comprising:
determining that at least one of the first user-inserted emoji reaction icon or the second system-specified emoji reaction icon expresses a user sentiment towards the combined message; and creating the combined message to include at least one of the second user-inserted emoji reaction icon or the second system-specified emoji reaction icon along with at least one of the first user-inserted emoji reaction icon of the first user message or the second user-inserted emoji reaction icon of the second user message.

14. The computer-implemented method of claim 13, further comprising:
  determining that at least one of the second user-inserted emoji reaction icon or the second system-specified emoji reaction icon is the same as the first system-specified emoji reaction icon; and
  providing an increased weighted score of the second user-inserted emoji reaction icon and the second system-specified emoji reaction icon such that the increased weighted score of the second user-inserted emoji reaction icon and the second system-specified emoji reaction icon is more than a weighted score of the first system-specified emoji reaction icon,
  wherein the untrained machine learning model is configured to learn to predict the future emoji reaction icon upon receipt of the third user message based on the increased weighted score of the second user-inserted emoji reaction icon and the second system-specified emoji reaction icon and the weighted score of the first system-specified emoji reaction icon.

15. The computer-implemented method of claim 1, further comprising:
  determining that at least one of the second user-inserted emoji reaction icon or the second system-specified emoji reaction icon does not express a user sentiment towards the combined message; and
  dropping at least one of the second user-inserted emoji reaction icon or the second system-specified emoji reaction icon that does not express a user sentiment towards the combined message,
  wherein the untrained machine learning model is configured to learn to predict the future emoji reaction icon upon receipt of the third user message based on at least one of the second user-inserted emoji reaction icon or the second system-specified emoji reaction icon not expressing a user sentiment towards the combined message.

16. The computer-implemented method of claim 1, wherein the predicted future emoji reaction icon is different from at least one of the first user-inserted emoji reaction icon, the first system-specified emoji reaction icon, or the second system-specified emoji reaction icon.

17. The computer-implemented method of claim 1, wherein the first user message and the second user message are provided by a same user.

18. The computer-implemented method of claim 1, wherein the first user message and the second user message are provided by a first user and a second user, respectively.

19. A system, comprising:
  a memory; and
  a processor coupled to the memory and configured to:
    receive a first user message and a second user message, wherein the first user message comprises at least one of a first user text or a first user-inserted emoji reaction icon, wherein the second user message comprises at least one of a second user text or a second user-inserted emoji reaction icon, and wherein at least one of the first user text or the second user text is associated with a first system-specified emoji reaction icon or a second system-specified emoji reaction icon, respectively;
    determine that the first user message is associated with the second user message based on one or more triggering conditions that are used to determine whether to combine the first user message with the second user message, wherein the one or more triggering conditions depend on whether each of the first user message and the second user message comprises user text alone, one or more emoji reaction icons alone, or a combination of user text and one or more emoji reaction icons;
    create a combined message comprising at least one of at least a portion of the first user text or the first user-inserted emoji reaction icon and at least one of at least a portion of the second user text or the second user-inserted emoji reaction icon;
    determine an appropriate emoji reaction icon associated with the combined message; and
    send the combined message and the appropriate emoji reaction icon to an untrained machine learning model,
  wherein:
    the first user-inserted emoji reaction icon and the first system-specified emoji reaction icon express a user sentiment towards the first user text of the first user message, and
    the second user-inserted emoji reaction icon and the second system-specified emoji reaction icon express a user sentiment towards the second user text of the second user message,
    whereby the untrained machine learning model is configured to learn to predict a future emoji reaction icon upon receipt of a third user message based on the combined message and appropriate emoji reaction icon; and
  wherein in determining that the first user message is associated with the second user message, the processor is configured to at least one of:
    identify a known character associated with a user message correction in the second user text of the second user message;
    determine that the first user text of the first user message is grammatically complete when associated with the second user text of the second user message;
    determine that the second user text of the second user message is a single word or a single phrase; or
    determine that the second user message comprises the second user-inserted emoji reaction icon and is an emoji only message.

20. A non-transitory computer-readable device having instructions stored thereon that, when executed by at least one computing device, cause the at least one computing device to perform operations comprising:
  receiving a first user message and a second user message, wherein the first user message comprises at least one of a first user text or a first user-inserted emoji reaction icon, wherein the second user message comprises at least one of a second user text or a second user-inserted emoji reaction icon, and wherein at least one of the first user text or the second user text is associated with a first system-specified emoji reaction icon or a second system-specified emoji reaction icon, respectively;
  determining that the first user message is associated with the second user message based on one or more triggering conditions that are used to determine whether to combine the first user message with the second user message, wherein the one or more triggering conditions depend on whether each of the first user message and the second user message comprises user text alone, one or more emoji reaction icons alone, or a combination of user text and one or more emoji reaction icons;
  creating a combined message comprising at least one of at least a portion of the first user text or the first user-inserted emoji reaction icon and at least one of at least a portion of the second user text or the second user-inserted emoji reaction icon;

determining an appropriate emoji reaction icon associated with the combined message; and sending the combined message and the appropriate emoji reaction icon to an untrained machine learning model, wherein:

the first user-inserted emoji reaction icon and the first system-specified emoji reaction icon express a user sentiment towards the first user text of the first user message, and the second user-inserted emoji reaction icon and the second system-specified emoji reaction icon express a user sentiment towards the second user text of the second user message, whereby the untrained machine learning model is configured to learn to predict a future emoji reaction icon upon receipt of a third user message based on the combined message and appropriate emoji reaction icon; and wherein the determining that the first user message is associated with the second user message comprises at least one of:

identifying a known character associated with a user message correction in the second user text of the second user message;

determining that the first user text of the first user message is grammatically complete when associated with the second user text of the second user message;

determining that the second user text of the second user message is a single word or a single phrase; or determining that the second user message comprises the second user-inserted emoji reaction icon and is an emoji only message.

* * * * *